United States Patent Office 2,883,324
Patented Apr. 21, 1959

2,883,324

THERAPEUTIC MIXTURE OF CARBOXYLIC CATION EXCHANGE RESIN AND ITS COBALT SALT

Francis M. Thurmon, Boston, Mass., assignor to Rohm & Haas Company, Philadelphia, Pa., a corporation of Delaware No Drawing. Application June 16, 1955
Serial No. 516,020

6 Claims. (Cl. 167—58)

This invention deals with the preparation of therapeutic compositions containing carboxylic cation-exchange resin in the form of a cobalt salt and carboxylic cation-exchange resin in hydrogen form and with the resulting compositions for topical use to treat infections of body surface.

I have discovered that dermatologically useful compositions may be prepared by treating an alkali metal salt of a carboxylic cation-exchange resin with an aqueous solution of a water-soluble cobalt salt and washing the thus treated resin with water, whereby a cobalt salt of said resin is formed, and mixing said cobalt resin salt with a carboxylic cation-exchange resin in hydrogen form, said resin in hydrogen form imparting a pH of 3 to 5.5 to an aqueous 0.15 N sodium chloride solution. This mixture may now be diluted with a dermatologically acceptable carrier, as with a finely divided solid carrier to form a dusting powder, or taken up in a liquid vehicle to provide a lotion or cream, or dispersed in an ointment base.

It has been found that a therapeutic composition formed as just described should contain at least about 0.2% of a cobalt carboxylate cation-exchange resin and about 0.5% of a carboxylic exchanger in hydrogen form. Higher concentrations of each of these exchange resins may, of course, be used, there being no sharp upper limits. It is usually preferred that the compositions of this invention contain from 0.5% to 20% of the cobalt carboxylate cation-exchange resin, although as a high a percentage such as 40% can be used effectively in some cases, depending upon the type and formulation of the particular therapeutic composition and upon the specific applications. Thus, compositions in which the two kinds of resins are dispersed in a powder base may usefully contain up to 40% of each, while with lotions, creams, or ointments the preferable ranges are usually 0.2% to 20% and about 0.5% to 20% of each kind respectively.

The carboxylic resin in its hydrogen form constitutes from about 0.5 to 40% of the therapeutic composition. There is preferably used from 1% to 20% of this resin, the percentage depending in part on the content of cobalt carboxylate resin used and also upon the type and formulation of the therapeutic composition.

The cobalt carboxylate resin and the carboxylic exchange resin in hydrogen form, which are intimately blended and dispersed in a carrier, should be finely particled. Particle sizes must be less than 100 mesh, preferably are less than 250 mesh, and best less than 325 mesh.

The cation-exchange resins here used depend for their activity upon the presence of the carboxy radical. In the acidic form this radical is, of course, —COOH, there being a multiplicity of these groups attached to a resin network which ensures insolubility of the cation-exchange resin. In the salt form the carboxyl groups hold metal ions. Here, the particular salt of interest is the cobalt salt.

The carboxylic exchange resins may be prepared from carboxylic acids or their anhydrides which have an unsaturated linkage through which they polymerize or may enter into copolymerization with other compounds having polymerizable unsaturated linkages. Copolymers are rendered insoluble by including a polymerizable substance having at least two double bonds which are not conjugated and which whereby promote cross-linking. For example, maleic anhydride and styrene may be copolymerized in the presence of a polyunsaturated compound, such as divinylbenzene, trivinylbenzene, ethylene diacrylate, or diallyl maleate, fumarate, or itaconate to give insoluble resins. Acrylic or methacrylic acid may likewike be copolymerized with a polyunsaturated compound to form insoluble cation-exchange resins. Carboxylic groups may also be obtained by hydrolysis of ester groups in cross-linked resins.

Carboxy-containing copolymers are formed in the conventional way with the aid of a polymerization initiator or catalyst such as an azo catalyst or a peroxidic catalyst, including benzoyl peroxide, lauroyl peroxide, tert-butyl hydroperoxide, tert-butyl perbenzoate, etc. The copolymer formed may be crushed to a fine powder. Insoluble carboxylic resins may also be formed by emulsion polymerization and then precipitated. Commercial resins are available of various types which depend on carboxy groups as the active functional groups and are made in a form and purity suitable for pharmaceutical uses.

When acid anhydride groups are present in a copolymer, they are converted to carboxy groups. If such a resin or one containing free carboxylic acid groups is treated with an alkali, the alkali carboxylate is formed. This can be converted to the acid form by washing with aqueous acid. Also, the alkali metal salt is used for preparation of the cobalt salt by ion exchange.

The alkali metal form of the carboxylic cation-exchange resin is washed with an aqueous solution of a soluble cobalt salt, such as cobalt chloride, nitrate, or sulfate. The exchange of alkali metal ions for cobalt ion may be accomplished batchwise or in a column. The cobalt form is well washed with water to remove soluble salts. For lotions, pastes, or ointments the cobalt resin is best used in solvated form, in which state it is swollen and soft. The resin in acidic form is also used in a solvated form in lotions and ointments. If the cobalt resin and also the resin in hydrogen form are to be used in powders, they are freed of excess water and dried sufficiently to permit blending with a finely divided solid carrier.

In a typical preparation of resin in the form of cobalt carboxylate a 1000 part portion of an exchange resin from a mixture of 98% of methacrylic acid and 2% of divinylbenzene, copolymerized with benzoyl peroxide as initiator and washed free of soluble materials, including traces of inhibitors and starting materials, initiator, and monomers, is washed with aqueous 4% sodium hydroxide solution in three steps to ensure conversion to the sodium salt form. The resin is then rinsed with deionized water several times and then treated with about 2000 parts of an aqueous 4% cobalt sulfate solution. The mixture is stirred for an hour. The resin is then allowed to settle out and the supernatant liquid is decanted. This operation is repeated three times. The resin then is rinsed three times with deionized water. The resin contains by analysis about 24% of cobalt, corresponding to an 80% conversion. When this resin is dispersed in an ointment base or a lotion base, it shows therapeutic action even at as low concentrations as about one quarter percent. While such therapeutic compositions contain about 0.05% of cobalt, they nevertheless show bacteriostatic action. In fact against some bacteria bacteriostatic action is evident at 0.02% of cobalt.

In the same general way other carboxylic cation-exchange resins may be converted to the form of alkali metal salts and this salt form converted to the cobalt salt form. Useful resins comparable to the above can be made with acrylic acid or itaconic acid in place of the above methacrylic acid. The proportion of cross-linking agent can be varied from about 0.5% to 10% or more in place of the above 2%.

The cobalt carboxylate resin thus formed can now be used in a lotion, paste, or ointment in the swollen, hydrated form. Also, it may be dried, as by heating, if desired under reduced pressure, until free of at least superficial moisture, and sufficiently dry to be mixed with a finely divided solid carrier. The resin may also be air-dried at low temperatures, as at 20°–30° C.

In another way of preparing the cobalt form of a carboxylic cation-exchange resin 3800 parts of a washed and powdered copolymer from 97% of methacrylic acid and 3% of divinylstyrene, by way of example, is converted to the alkali metal salt form by repeated treatment with aqueous 4% sodium hydroxide or potassium hydroxide, or carbonate solution. This salt form is washed with water and then with aqueous 5% hydrochloric acid to restore it to the acid form, which is washed with deionized water, thus effecting additional purification.

This purified resin is again washed with aqueous 4% sodium hydroxide solution until converted to the salt form, which is well washed with deionized water. The washed resin is placed in a glass column and about 7000 parts of an aqueous 4% cobalt chloride solution is slowly passed therethrough. The resin is thus converted to its cobalt salt form, which is thoroughly washed with deionized water. This resin is now dried at 50° to 60° C. under reduced pressure and ground in a ball mill to ensure fine particle size. The ground resin is sifted to remove particles coarser than 250 mesh. It may be used in this form in powders or dusts or it may be taken up in hydrophilic liquids or lotions or in a hydrophilic ointment base. Before it is used in lotions or ointments, it is best rinsed with water to ensure a hydrated state.

The above dried resin contains by analysis about 29% of cobalt. It is in a highly effective and pure form.

In the preparation of powders the cobalt carboxylate resin in finely divided form is mixed with a finely divided carboxylic resin which is in its hydrogen form and imparts to a 0.15 N sodium or potassium chloride solution, when tested at about one gram of resin in 25 ml. of such solution, a pH between 3 and 5.5, preferably from pH 3.5 to pH 5.0. These two resins are extended in a finely particled solid carrier, such as talc, clay, starch or mixtures thereof. There may also be used zinc or magnesium stearate or other conventionally used, inert finely divided solids, which are usually water-insoluble. The solids may carry small amounts of normally liquid materials, such as humectants, oils, or greases, including lanolin, also tinting materials and perfumes.

A dusting powder, for example, may be prepared by mixing 25 parts by weight of a finely powdered acidic carboxylic cation-exchange resin of pharmaceutical grade from methacrylic acid, styrene, and divinylbenzene, having a pH of about 3.5, 5 parts of the cobalt salt of this same resin, 60 parts of talc, 5 parts of perfumed starch, and 5 parts of white clay. The mixture is stirred, passed through a ball mill and sieved. In another formula there are thoroughly mixed 15 parts of a purified carboxylic exchange resin, from acrylic acid and polyvinylbenzenes, in its acid form, 3 parts of the cobalt salt of this resin, 2 parts of zinc stearate, and 80 parts of a mixture of equal weights of talc, clay and starch. For yet another dusting powder there are thoroughly mixed 2 parts of a purified acidic carboxylic resin from methacrylic acid and divinylbenzene, 3 parts of the cobalt salt of this same resin, and 95 parts of a premixed powder base containing 80% of talc, 10% of kaolin, 7% of titanium white, and 1% of a non-ionic wetting agent. In still another formulation there are mixed one part of a purified carboxylic exchange resin in hydrogen form giving a pH of 3 in physiologically normal salt solution, one half part of the cobalt salt of a carboxylic exchange resin made by hydrolyzing a copolymer of ethyl acrylate and divinylbenzene, a resin which in acid form gives a pH of 2.5, and 98.5 parts of a perfumed powder base containing talc, clay, and starch.

When lotions or ointments are desired, a cobalt carboxylate resin and a defined acidic carboxylate resin are taken up or dispersed in liquid or pasty vehicles. The resulting compositions may be varied from relatively thin or fluid products for patting onto external surfaces through creams to ointments and salves of different textures for smearing on. It is usually preferable that the lotions be based on hydrophilic liquids or mixtures miscible with water. Ointments may be made with a hydrophilic base, a gelatinous aqueous paste, or other ointment base containing inert organic ingredients such as thickened mineral oils, petrolatum, or other conventional bases for salves, although it will be apparent that the salves made with hydrophobic bases are generally slower acting than preparations made with hydrophilic bases. Where prolonged, controlled action is desired, this may be an advantage.

Carriers for lotions, creams, ointments, and salves may vary from glycerine, glycerine-starch pastes, and dispersions of thickening agents such as tragacanth, karaya, quince seed gum, Irish moss, pectin, alginates, cellulose ethers, and polyethylene glycol waxes, through ointment bases as made from stearic acid, cetyl alcohol, lanolin, petroleum oils, spermaceti, petroleum waxes, or white wax, dispersed in an aqueous medium with emulsifier such as ethanolamine soaps, glyceryl monolaurate, glycol monolaurate, glyceryl monostearate, polyglycerol-fatty acid condensates, non-ionic emulsifiers, and other emulsifying and dispersing agents, to petrolatum and oils thickened, for example, with polymers, such as polyethylene or polyacrylates, dispersed therein. Other useful bases include methyl cellulose-glycerin pastes and bentonitic bases which are neutral or have an acidity not greater than about pH 3.

A typical ointment may be made in the following way. An ointment is prepared from 30 parts by weight of glyceryl monostearate, 30 parts of glyceryl laurate, 60 parts of stearic acid, 300 parts of water, preservative (such as a mixture of propyl and methyl p-hydroxybenzoate at 0.05%), and perfume. There are mixed 96 parts of this ointment and 4 parts of a mixture of equal weights of a mixture of a cobalt carboxylate resin from acrylic acid and divinylbenzene and an acidic carboxylic cation-exchange resin from methacrylic acid and divinylbenzene having a pH of 3.5. This mixture of resins is wet with water and sucked free of surface water before being incorporated.

Another preparation utilizes three parts of the cobalt salt of a carboxylic resin from metacrylic acid and divinylbenzene, two parts of this resin in hydrogen form, and 95 parts of an ointment base made from 250 parts of cetyl-stearyl alcohols, 250 parts of white mineral oil, 120 parts of propylene glycol, 15 parts of emulsifying agents, 0.25 part of methyl p-hydroxybenzoate, 0.15 part of propyl p-hydroxybenzoate, and 365 parts of water.

In another example of an ointment there are mixed four parts of the cobalt salt of a carboxylic exchanger from methacrylic acid and divinylbenzene, eight parts of this same resin in hydrogen form (pH 3.4), and 88 parts of an aqueous hydrophilic base from waxy polyethylene glycol. The resins mixed with the base are in swollen and hydrated form. There may likewise be mixed 1.5 parts of the same cobalt salt, one part of the resin in hydrogen form, and 97.5 parts of the same hydrophilic base to form a useful ointment.

A typical lotion base is made by warming 50 parts of a 2% quince seed mucilage and adding thereto a warm mixture of 5 parts of glycerine, 3.8 parts of ethyl alcohol, 39 parts of water, 1.2 parts of stearic acid, 0.3 part of ricinoleic acid, 0.3 part of triethanolamine, 0.3 part of glyceryl monostearate, and 0.4 part of sweet almond oil. To 90 parts of the resulting mixture there are added 5 parts of the cobalt salt of a carboxylic exchange resin from methacrylic acid and ethylene dimethacrylate and 5 parts of this resin in hydrogen form.

Compositions of this invention are useful for topical applications against mycotic or bacterial or mixed bacterial and fungus infections. The particular form of composition—powder, lotion, cream, or ointment—will be selected on the basis of type of infection, degree of involvement, and region to be treated.

This application is a continuation-in-part of my applications Serial Nos. 389,148 and 389,149 (Patent No. 2,838,440), filed October 29, 1953, which are continuations-in-part of my earlier filed applications 187,356 and 187,358, filed September 28, 1950, now abandoned.

I claim:

1. A therapeutic composition for external use comprising in admixture dispersed in a therapeutically acceptable carrier a finely particled carboxyl-containing cation-exchange resin, the carboxyl groups being in the form of cobalt carboxylate groups, and a finely particled carboxylic cation-exchange resin in hydrogen form which imparts to an aqueous 0.15 N sodium chloride solution a pH between 3 and 5.5, said carboxyl-containing resin constituting 0.2% to 40% and said carboxylic cation-exchange resin constituting 0.5% to 40% of the composition by weight.

2. A therapeutic composition for external use comprising in admixture dispersed in a therapeutically acceptable carrier a finely particled carboxyl-containing cation-exchange resin, the carboxyl groups being in the form of cobalt carboxylate groups, and a finely particled carboxylic cation-exchange resin in hydrogen form which imparts to an aqueous 0.15 N sodium chloride solution a pH between 3 and 5.5, said carboxyl-containing resin constituting 0.5% to 20% and said carboxylic cation-exchange resin constituting 1% to 20% of the composition by weight.

3. A therapeutic composition for external use comprising 0.2% to 40% of a carboxylic cation-exchange resin in the form of its cobalt salt and 0.5% to 40% of a carboxylic cation-exchange resin in hydrogen form which imparts to an aqueous 0.15 N sodium chloride solution a pH between 3 and 5.5, said resin in the form of its cobalt salt and said resin in hydrogen form being of a particle size less than 250 mesh and being dispersed in a therapeutically acceptable powder base.

4. A therapeutic composition for external use comprising 0.2% to 20% of a carboxylic cation-exchange resin in the form of its cobalt salt and about 0.5% to 20% of a carboxylic cation-exchange resin in hydrogen form which imparts to an aqueous 0.15 N sodium chloride solution a pH between 3 and 5.5, said resin in the form of its cobalt salt and said resin in hydrogen form being of a particle size less than 250 mesh and being dispersed in an ointment base.

5. A composition according to claim 4 wherein the ointment base is hydrophilic.

6. A therapeutic composition for external use comprising 0.2% to 20% of a carboxylic cation-exchange resin in the form of its cobalt salt and about 0.5% to 20% of a carboxylic cation-exchange resin in hydrogen form which imparts to an aqueous 0.15 N sodium chloride solution a pH between 3 and 5.5, said resin in the form of its cobalt salt and said resin in hydrogen form being of a particle size less than 250 mesh and being dispersed in a dermatologically and therapeutically acceptable hydrophilic liquid carrier.

References Cited in the file of this patent

UNITED STATES PATENTS

| | | |
|---|---|---|
| 2,628,186 | Shive | Feb. 10, 1953 |
| 2,764,518 | Thurmon | Sept. 25, 1956 |

OTHER REFERENCES

Nachod: Ion Exchange, 1949, Academic Press, N.Y., p. 175.

New and Nonofficial Remedies, A.M.A. Council on Pharm. and Chem., J. B. Lippincott Co., 1951, pp. 27–31.